Patented Mar. 30, 1937

2,075,743

UNITED STATES PATENT OFFICE 2,075,743

MORDANT AZODYESTUFFS AND THEIR PRODUCTION

Max Müller, Basel, Switzerland, assignor to the firm Durand & Huguenin S. A., Basel, Switzerland No Drawing. Application December 21, 1934, Serial No. 760,063. In Germany December 27, 1933

7 Claims. (Cl. 260—97)

Aminoazo-compounds, such as they are obtainable, for example, by diazotizing a nitraniline sulphonic acid, coupling the diazo-compound with an ortho-oxybenzene-carboxylic acid (such as salicylic acid) and reducing the nitro-group to the amino-group, are quite without interest as mordant dyestuffs for printing cotton, since the prints obtained by means of such dyestuffs are not at all fast.

According to this invention by causing an unsulphonated compound of the benzene series containing a halogen atom which is easily replaceable, for example dinitrochlorobenzene, to react with the aforesaid aminoazo-compounds, whereby evidently a halogen hydride (hydrochloric acid) is split off and the phenyl radical enters the free amino-group of the aminoazo-compound, there are obtained new dyestuffs which yield in chrome printing on cotton reddish-yellow to brown-orange shades having good fastness properties. These new dyestuffs dissolve in concentrated sulphuric acid with a red-orange or red-violet to blue-violet coloration, whereas the starting materials, the aminoazo-compounds, give yellow solutions. It has been found that this reaction proceeds smoothly in the case of those compounds in which there is no negative substituent, such as a sulpho-group, a carboxylic-group or a nitro-group in ortho-position to the amino-group which enters into reaction.

The dyestuffs obtainable in accordance with the invention may be presumed to have the following general formula:

$R_1.N=N.R_2.NH.R_3$ wherein $R_1$ represents a benzene nucleus containing a hydroxyl-group and a carboxyl-group in ortho-position to one another, $R_2$ represents a benzene nucleus bearing at least one member of the group consisting of hydrogen, methyl, methoxy, sulpho, carboxylic and nitro, the last three named substituents not being in ortho position to the NH-group, and $R_3$ represents a phenyl radical resulting from the unsulphonated benzene compound containing an easily replaceable halogen atom.

The following examples illustrate the invention, without being limitative, the parts being by weight.

Example 1

337 parts of the aminoazo-dyestuff, obtainable by diazotizing 4-nitraniline-2-sulphonic acid, coupling with salicylic acid and reducing the nitro-group in the product to the amino-group, are dissolved at a raised temperature in 2500 parts of water and 110 parts of anhydrous sodium carbonate. The solution is heated to 80–90° C. and there are introduced, whilst well stirring, alternately in small portions 250 parts of 2,4-dinitro-1-chloro-benzene dissolved in 800 parts of alcohol and 200 parts of crystallized sodium acetate. Afterwards the whole mass is boiled under reflux for 15 hours. After this time the reaction is discontinued.

A part of the condensation product has already separated from the hot solution and, after cooling, the precipitation is practically complete. The condensation product is filtered and is easily freed from any small quantity of the aminoazo-compound which has not reacted by washing with water in which the aminoazo-compound is very much more soluble than is the condensation product. The new dyestuff thus obtained is an orange-red powder. In the form of the sodium salt it is sparingly soluble in cold water but more freely soluble in hot water. The color of its solution in concentrated sulphuric acid is violet, whilst that of the parent aminoazo-body is yellow. In chrome printing on cotton the product yields reddish-yellow shades of good fastness properties.

There may be used in this example with similar results, instead of the 2:4-dinitro-1-chloro-benzene, picrylchloride or dinitro-bromo-benzene. Calcium carbonate, for example, may be used instead of sodium acetate as acid binding agent.

Example 2

257 parts of the aminoazo-compound: m-aminobenzene-azosalicylic acid (which is obtainable in the usual way from m-nitraniline by diazotizing and coupling with salicylic acid and by reducing the nitro-group to the amino-group), are dissolved hot in 4500 parts of water and 55 parts of anhydrous sodium carbonate. The solution is heated up to 90–95° C. Then there are added, whilst stirring (continuously), alternately in small portions 210 parts of 2,4-dinitro-1-chlorobenzene and 200 parts of crystallized sodium acetate. After about 8 hours the reaction is terminated. The precipitated dyestuff is separated by filtration and dissolved in alkali, the solution is filtered and acidified to re-precipitate the dyestuff.

The obtained dyestuff dissolves in concentrated sulphuric acid with a red-orange coloration, whereas the starting product dissolves therein with a yellow coloration.

The product is converted into a soluble alkaline salt. Printed on cotton the dyestuff yields orange-yellow shades of good fastness properties.

A similar product can be obtained from para-amino-benzeneazo-salicylic acid and 2,4-dinitro-1-chloro-benzene. The same dissolves in concentrated sulphuric acid to a violet solution.

*Example 3*

301 parts of the aminoazo-compound which corresponds to the following formula:

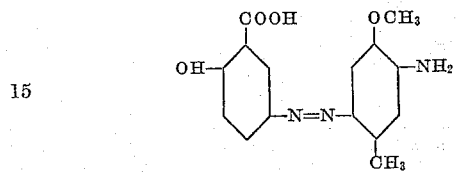

(obtainable as usual from the diazotized p-amino-salicylic acid by coupling with cresidine

in weak acid solution), 210 parts of 2,4-dinitro-1-chloro-benzene and 2000 parts of alcohol are heated up to the boil point on the reflux, whilst stirring, then there are added progressively in small portions 200 parts of crystallized sodium acetate. After about 5 hours the free aminoazo-compound is no more to be traced. Then the mass is cooled down and the crystalline precipitated dyestuff separated by filtration, whereupon the dyestuff is rinsed with some alcohol.

The product thus obtained yields in concentrated sulphuric acid a blue-violet color, whereas the starting material dissolves therein with a yellow coloration.

The dyestuff is converted as usual into its soluble sodium salt. Printed on cotton the dyestuff yields brown shades of good fastnesses.

Instead of salicylic acid there may also be used for the preparation of the aminoazo-compounds of the kind hereinbefore described homologues and substitution products thereof, such as ortho-cresotinic acid, meta-cresotinic acid, chloro-salicylic acid and others.

What I claim is:—

1. A process for the manufacture of mordant azodyestuffs of the following probable general formula:

wherein $R_1$ represents a benzene nucleus containing a hydroxy and a carboxylic group in ortho-position to one another, $R_2$ represents a benzene nucleus bearing at least one member of the group consisting of hydrogen, methyl, methoxy, sulpho, carboxylic and nitro, the three last named substituents not being in ortho-position to the NH-group, and $R_3$ represents a nitrated phenyl radical having no sulpho or carboxylic groups, said process consisting in taking an aminoazo-compound of the general formula:

wherein $R_1$ and $R_2$ have the above defined meaning and causing this compound to react with a nitro-halogen-benzene compound containing an easily exchangeable halogen atom.

2. A process for the manufacture of mordant azodyestuffs of the probable general formula:

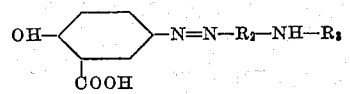

wherein $R_2$ represents a benzene nucleus bearing at least one member of the group consisting of hydrogen, methyl, methoxy, sulpho, carboxylic and nitro, the three last named substituents not being in ortho-position to the NH-group, and $R_3$ represents a nitrated phenyl radical having no sulpho or carboxylic groups, said process consisting in taking an aminoazo compound of the following general formula:

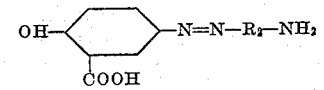

wherein $R_2$ has the above defined meaning, and causing this compound to react with a nitro-halogen-benzene compound containing an easily exchangeable halogen atom.

3. A process for the manufacture of mordant azodyestuffs of the following probable general formula:

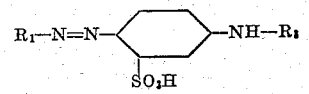

wherein $R_1$ represents a benzene nucleus containing a hydroxy and a carboxylic group in ortho-position to one another, and $R_3$ represents a nitrated phenyl radical having no sulpho or carboxylic groups, said process consisting in taking an aminoazo compound of the general formula:

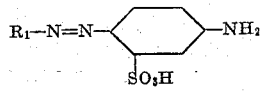

wherein $R_1$ has the above defined meaning and causing this compound to react with a nitro-halogen-benzene compound containing an easily exchangeable halogen atom.

4. A process for the manufacture of mordant azodyestuffs of the following probable general formula:

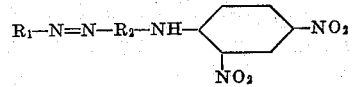

wherein $R_1$ represents a benzene nucleus containing a hydroxy and a carboxylic group in ortho-position to one another, $R_2$ represents a benzene nucleus bearing at least one member of the group consisting of hydrogen, methyl, methoxy, sulpho, carboxylic and nitro, the three last named substituents not being in ortho-position to the NH-group, said process consisting in taking an aminoazo compound of the general formula:

wherein $R_1$ and $R_2$ have the above defined meaning, and causing this compound to react with 2,4-dinitro-1-chloro-benzene.

5. A process for the manufacture of a mordant azodyestuff of the following formula:

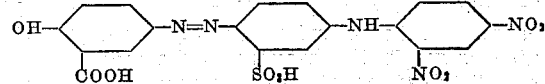

said process consisting in taking the aminoazo compound of the formula:

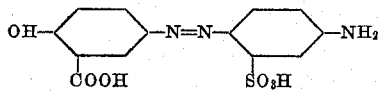

and causing this compound to react with 2,4-dinitro-1-chloro-benzene.

6. Mordant azodyestuffs corresponding to the following general formula:

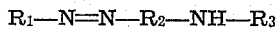

wherein $R_1$ represents a benzene nucleus containing as substituents a hydroxy and a carboxylic group in ortho-position to one another, $R_2$ stands for a benzene nucleus bearing at least one member of the group consisting of hydrogen, methyl, methoxy, sulpho, carboxylic and nitro, the three last named substituents not being in ortho-position to the NH-group, and $R_3$ stands for a nitrated phenyl radical having no sulpho or carboxylic groups, said dyestuffs constituting yellow to brown powders, being in form of their alkali-metal salts soluble in water to yellow or brown solutions, dissolving in concentrated sulphuric acid with red-orange to violet coloration and yielding in chrome printing yellow to brown shades of good fastness properties.

7. The mordant azodyestuff of the following formula:

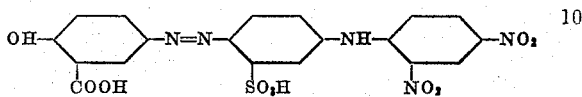

said dyestuff constituting an orange-red powder, being in form of its sodium salt soluble in water, dissolving in concentrated sulphuric acid with violet coloration and yielding in chrome printing reddish-yellow shades of good fastness properties.

MAX MÜLLER.